United States Patent
Robertson (10) Patent No.: US 8,974,928 B2
(45) Date of Patent: *Mar. 10, 2015

(54) HEATING SYSTEM FOR A BATTERY MODULE AND METHOD OF HEATING THE BATTERY MODULE

(75) Inventor: David C. Robertson, Chicago, IL (US)

(73) Assignee: LG Chem, Ltd., Seoul (KR)

( * ) Notice: Subject to any disclaimer, the term of this patent is extended or adjusted under 35 U.S.C. 154(b) by 517 days.

This patent is subject to a terminal disclaimer.

(21) Appl. No.: 13/173,277

(22) Filed: Jun. 30, 2011

(65) Prior Publication Data

US 2013/0004803 A1 Jan. 3, 2013

(51) Int. Cl.
| | |
|---|---|
| H01M 10/50 | (2006.01) |
| H01M 10/615 | (2014.01) |
| H01M 10/633 | (2014.01) |
| H01M 10/6563 | (2014.01) |
| H01M 10/6571 | (2014.01) |
| H01M 10/052 | (2010.01) |

(52) U.S. Cl.
CPC ........ H01M 10/5006 (2013.01); *H01M 10/052* (2013.01); H01M 10/5022 (2013.01); H01M 10/5067 (2013.01); H01M 10/5083 (2013.01); *Y02T 10/7011* (2013.01)
USPC .............................................. 429/50; 429/62

(58) Field of Classification Search
CPC ....................... H01M 10/5083; H01M 10/5067
USPC ..................................................... 429/62, 50
See application file for complete search history.

(56) References Cited

U.S. PATENT DOCUMENTS 4,390,841 A 6/1983 Martin et al.
(Continued)

FOREIGN PATENT DOCUMENTS

| JP | 9243716 A | 9/1997 |
|---|---|---|
| JP | 9312901 A | 12/1997 |

(Continued)

OTHER PUBLICATIONS

International Search Report dated Jul. 25, 2005 for International Application No. PCT/KR2004/003103.
(Continued)

*Primary Examiner* — Nicholas P D'Aniello
(74) *Attorney, Agent, or Firm* — Buckert Patent & Trademark Law Firm, PC; John F. Buckert (57) ABSTRACT

A heating system and a method for heating a battery module are provided. The method includes generating a first signal indicative of a first voltage level being output by a first battery cell group, and generating a second signal indicative of a second voltage level being output by a second battery cell group. The method includes generating a temperature signal indicative of a temperature level of at least one of the first battery cell group and the second battery cell group. If the temperature level is less than a threshold temperature level, and the first battery cell group is not electrically balanced with the second battery cell group then the method includes selecting one of the first and second battery cell groups to be at least partially discharged through a resistor to generate heat energy in the resistor.

14 Claims, 4 Drawing Sheets

(56) References Cited

U.S. PATENT DOCUMENTS

| | | | |
|---|---|---|---|
| 5,578,915 | A | 11/1996 | Crouch, Jr. et al. |
| 5,606,242 | A | 2/1997 | Hull et al. |
| 5,644,212 | A | 7/1997 | Takahashi |
| 5,652,502 | A | 7/1997 | van Phuoc et al. |
| 5,658,682 | A | 8/1997 | Usuda et al. |
| 5,694,335 | A | 12/1997 | Hollenberg |
| 5,701,068 | A | 12/1997 | Baer et al. |
| 5,714,866 | A | 2/1998 | S et al. |
| 5,739,670 | A | 4/1998 | Brost et al. |
| 5,796,239 | A | 8/1998 | van Phuoc et al. |
| 5,825,155 | A | 10/1998 | Ito et al. |
| 5,936,385 | A | 8/1999 | Patillon et al. |
| 6,016,047 | A | 1/2000 | Notten et al. |
| 6,064,180 | A | 5/2000 | Sullivan et al. |
| 6,160,376 | A | 12/2000 | Kumar et al. |
| 6,232,744 | B1 | 5/2001 | Kawai et al. |
| 6,285,163 | B1 | 9/2001 | Watanabe et al. |
| 6,329,823 | B2 | 12/2001 | Blessing et al. |
| 6,353,815 | B1 | 3/2002 | Vilim et al. |
| 6,359,419 | B1 | 3/2002 | Verbrugge et al. |
| 6,362,598 | B2 | 3/2002 | Laig-Horstebrock et al. |
| 6,441,586 | B1 | 8/2002 | Tate, Jr. et al. |
| 6,515,454 | B2 | 2/2003 | Schoch |
| 6,534,954 | B1 | 3/2003 | Plett |
| 6,563,318 | B2 | 5/2003 | Kawakami et al. |
| 6,583,606 | B2 | 6/2003 | Koike et al. |
| 6,608,482 | B2 | 8/2003 | Sakai et al. |
| 6,646,421 | B2 | 11/2003 | Kimura et al. |
| 6,661,201 | B2 | 12/2003 | Ueda et al. |
| 6,724,172 | B2 | 4/2004 | Koo |
| 6,829,562 | B2 | 12/2004 | Sarfert |
| 6,832,171 | B2 | 12/2004 | Barsoukov et al. |
| 6,876,175 | B2 | 4/2005 | Schoch |
| 6,892,148 | B2 | 5/2005 | Barsoukov et al. |
| 6,919,952 | B2 | 7/2005 | Kruit |
| 6,927,554 | B2 | 8/2005 | Tate, Jr. et al. |
| 6,943,528 | B2 | 9/2005 | Schoch |
| 6,967,466 | B2 | 11/2005 | Koch |
| 6,984,961 | B2 | 1/2006 | Kadouchi et al. |
| 7,012,434 | B2 | 3/2006 | Koch |
| 7,039,534 | B1 | 5/2006 | Ryno et al. |
| 7,061,246 | B2 | 6/2006 | Dougherty et al. |
| 7,072,871 | B1 | 7/2006 | Tinnemeyer |
| 7,098,665 | B2 | 8/2006 | Laig-Hoerstebrock |
| 7,109,685 | B2 | 9/2006 | Tate, Jr. et al. |
| 7,126,312 | B2 | 10/2006 | Moore |
| 7,136,762 | B2 | 11/2006 | Ono |
| 7,138,775 | B2 | 11/2006 | Sugimoto et al. |
| 7,197,487 | B2 | 3/2007 | Hansen et al. |
| 7,199,557 | B2 | 4/2007 | Anbuky et al. |
| 7,233,128 | B2 | 6/2007 | Brost et al. |
| 7,250,741 | B2 | 7/2007 | Koo et al. |
| 7,253,587 | B2 | 8/2007 | Meissner |
| 7,315,789 | B2 | 1/2008 | Plett |
| 7,317,300 | B2 | 1/2008 | Sada et al. |
| 7,321,220 | B2 | 1/2008 | Plett |
| 7,327,147 | B2 | 2/2008 | Koch |
| 7,400,115 | B2 | 7/2008 | Plett |
| 7,424,663 | B2 | 9/2008 | Mehalel |
| 7,446,504 | B2 | 11/2008 | Plett |
| 7,518,339 | B2 | 4/2009 | Schoch |
| 7,521,895 | B2 | 4/2009 | Plett |
| 7,525,285 | B2 | 4/2009 | Plett |
| 7,583,059 | B2 | 9/2009 | Cho |
| 7,589,532 | B2 | 9/2009 | Plett |
| 7,593,821 | B2 | 9/2009 | Plett |
| 7,893,694 | B2 | 2/2011 | Plett |
| 2003/0015993 | A1 | 1/2003 | Misra et al. |
| 2003/0162084 | A1 | 8/2003 | Shigeta et al. |
| 2003/0184307 | A1 | 10/2003 | Kozlowski et al. |
| 2005/0100786 | A1 | 5/2005 | Ryu et al. |
| 2005/0127874 | A1 | 6/2005 | Lim et al. |
| 2006/0100833 | A1 | 5/2006 | Plett |
| 2007/0120533 | A1 | 5/2007 | Plett |
| 2008/0094035 | A1 | 4/2008 | Plett |
| 2008/0213652 | A1* | 9/2008 | Scheucher ............ 429/62 |
| 2008/0249725 | A1 | 10/2008 | Plett |
| 2009/0327540 | A1 | 12/2009 | Robertson et al. |
| 2011/0003182 | A1* | 1/2011 | Zhu ............ 429/50 |

FOREIGN PATENT DOCUMENTS

| | | |
|---|---|---|
| JP | 11003505 A | 1/1999 |
| JP | 11023676 A | 1/1999 |
| JP | 11032442 A | 2/1999 |
| JP | 11038105 A | 2/1999 |
| JP | 2002228730 A | 8/2002 |
| JP | 2002319438 A | 10/2002 |
| JP | 2002325373 A | 11/2002 |
| JP | 2003516618 A | 5/2003 |
| JP | 2003249271 A | 9/2003 |
| JP | 2003257501 A | 9/2003 |
| JP | 2004031014 A | 1/2004 |
| JP | 2004521365 A | 7/2004 |
| JP | 2006516326 A | 6/2009 |
| JP | 2010262879 A | 11/2010 |
| KR | 19970024432 A | 5/1997 |
| KR | 20020026428 A | 4/2002 |
| WO | WO0067359 A1 | 11/2000 |

OTHER PUBLICATIONS

International Search Report dated Mar. 31, 2005 for International Application No. PCT/KR2004/003332.

International Search Report dated Dec. 1, 2006 for International Application No. PCT/KR2006/003305.

S. Moore, P. Schneider; A review of Cell Equalization Methods for Lithium Ion and Lithium Polymer Battery Systems; 2001 Society of Automotive Engineers; Jan. 2001; pp. 1-5.

G. Plett; Advances in EKF SOC Estimation for LiPB HEV Battery Packs; Powering Sustainable Transportation EVS 20; Nov. 15-19, 2003; Long Beach, CA; pp. 1-12.

G. Welch, G. Bishop; An Introduction to the Kalman Filter; SIGGRAPH 2001 Course 8; Los Angeles, CA; Aug. 12-17, 2001; http//info.acm.org/pubs/toc/CRnotice.html, pp. 1-80.

E. Wan, A. Nelson; Dual Extended Kalman Filter Methods; Kalman Filtering and Neural Networks; 2001; pp. 123-173.

Yon et al.; Dynamic Multidimensional Wavelet Neural Network and its Application; Journal of Advanced Computational Intelligence and Intelligent Informatics; 2000; vol. 4, No. 5; pp. 336-340.

Fletcher et al; Estimation from Lossy Sensor Data: Jump Linear Modeling and Kalman Filtering; IPSN Apr. 26-27, 2004; Berkeley, California; pp. 251-258.

G. Plett; Extended Kalman Filtering for Battery Managements System of LiPB-based HEV Battery Packs—Part 1 Background; Journal of Power Sources 134; 2004; pp. 252-261.

G. Plett; Extended Kalman Filtering for Battery Managements System of LiPB-based HEV Battery Packs—Part 2 Background; Journal of Power Sources 134; 2004; pp. 262-276.

G. Plett; Extended Kalman Filtering for Battery Managements System of LiPB-based HEV Battery Packs—Part 3 Background; Journal of Power Sources 134; 2004; pp. 277-283.

G. Plett; Kalman-Filter SOC Estimation for LiPB HEV Cells; The 19th International Battery, Hybrid and Fuel Electric Vehicle Symposium and Exhibition; Oct. 19-23, 2002; Busan, Korea; pp. 1-12.

G. Plett; LiPB Dynamic Cell Models for Kalman-Filter SOC Estimation; The 19th International Battery, Hybrid and Fuel Electric Vehicle Symposium and Exhibition; Oct. 19-23, 2002; Busan, Korea; pp. 1-12.

S.C. Rutan; Recursive Parameter Estimation; 1990; Journal of Chemometrics; vol. 4; pp. 103-121.

P. Maybeck; Stochastic models, estimation and control, vol. 1; 1979; Academic Press Inc., 32 pp.

T. Hansen, C.J. Wang; Support vector based battery state of charge estimator; Journal of Power Sources, 2004; 6391; pp. 1-8.

(56) References Cited

OTHER PUBLICATIONS

V. Johnson et al.; Temperature-Dependent Battery Models for High-Power Lithium-Ion Batteries; Jan. 2001; NREL/CP-540-28716; 17th Annual Electric Vehicle Symposium Oct. 15-18, 2000.

U.S. Appl. No. 12/819,617, filed Jun. 21, 2010 entitled Voltage Management Methods and Systems for Performing Analog-to-Digital Conversions.

U.S. Appl. No. 12/822,285, filed Jun. 24, 2010 entitled Battery Management System and Method for Transferring Data within the Battery Management System.

U.S. Appl. No. 12/870,940, filed Aug. 30, 2010 entitled Systems and Methods for Determining a Warranty Obligation of a Supplier to an Original Equipment Manufacturer for a Vehicle Battery Pack.

U.S. Appl. No. 13/093,187, filed Apr. 25, 2011 entitled Battery System and Method for Increasing an Operational Life of a Battery Cell.

* cited by examiner

COMPUTER SELECTS THE SECOND BATTERY CELL GROUP IF THE FIRST VOLTAGE LEVEL IS LESS THAN THE SECOND VOLTAGE LEVEL BASED ON THE FIRST AND SECOND SIGNALS

FIG. 4

COMPUTER SELECTS THE FIRST BATTERY CELL GROUP IF THE FIRST VOLTAGE LEVEL IS GREATER THAN THE SECOND VOLTAGE LEVEL BASED ON THE FIRST AND SECOND SIGNALS.

FIG. 5

COMPUTER SELECTS THE SECOND BATTERY CELL GROUP IF A FIRST STATE-OF-CHARGE OF THE FIRST BATTERY CELL GROUP IS LESS THAN A SECOND STATE-OF-CHARGE OF THE SECOND BATTERY CELL GROUP, BASED ON THE FIRST AND SECOND SIGNALS

FIG. 6

COMPUTER SELECTS THE FIRST BATTERY CELL GROUP IF A FIRST STATE-OF-CHARGE OF THE FIRST BATTERY CELL GROUP IS GREATER THAN A SECOND STATE-OF-CHARGE OF THE SECOND BATTERY CELL GROUP, BASED ON THE FIRST AND SECOND SIGNALS

FIG. 7

HEATING SYSTEM FOR A BATTERY MODULE AND METHOD OF HEATING THE BATTERY MODULE

BACKGROUND

When electric vehicle batteries have relatively cold internal temperatures, an amount of electrical power that can be supplied by the batteries can be lower than a desired electrical power level.

The inventor herein has recognized a need for an improved heating system for a battery module and a method of heating the battery module to reduce and/or eliminate the above-mentioned deficiency.

SUMMARY

A heating system for a battery module in accordance with an exemplary embodiment is provided. The battery module has first and second battery cell groups. The heating system includes a first voltage sensor configured to generate a first signal indicative of a first voltage level being output by the first battery cell group. The heating system further includes a second voltage sensor configured to generate a second signal indicative of a second voltage level being output by the second battery cell group. The heating system further includes a first resistor configured to be electrically coupled to the first battery cell group when a first switch has a first operational position. The heating system further includes a second resistor configured to be electrically coupled to the second battery cell group when a second switch has a first operational position. The heating system further includes a temperature sensor configured to generate a temperature signal indicative of a temperature level of at least one of the first battery cell group and the second battery cell group. The computer is further configured to determine if the temperature signal indicates that the temperature level is less than a threshold temperature level. The computer is further configured to determine if the first battery cell group is electrically balanced with the second battery cell group based on the first and second signals. If the temperature level is less than the threshold temperature level, and the first battery cell group is not electrically balanced with the second battery cell group, then the computer is further configured to select at least one of the first and second battery cell groups to be at least partially discharged. If the second battery cell group is selected, then the computer is further configured to generate a first control signal to induce the second switch to have the first operational position to at least partially discharge the second battery cell group through the second resistor to generate heat energy in the second resistor. Further, the computer is configured to generate a second control signal to turn on a fan to distribute the heat energy in the battery module to increase the temperature level of the battery module.

A method for heating a battery module in accordance with another exemplary embodiment is provided. The battery module has first and second battery cell groups. The method includes generating a first signal indicative of a first voltage level being output by the first battery cell group utilizing a first voltage sensor. The method further includes generating a second signal indicative of a second voltage level being output by the second battery cell group utilizing a second voltage sensor. The method further includes generating a temperature signal indicative of a temperature level of at least one of the first battery cell group and the second battery cell group utilizing a temperature sensor. The method further includes determining if the first battery cell group is electrically balanced with the second battery cell group based on the first and second signals utilizing a computer. If the temperature level is less than a threshold temperature level and the first battery cell group is not electrically balanced with the second battery cell group then the method further includes selecting at least one of the first and second battery cell groups to be at least partially discharged, utilizing the computer. If the second battery cell group is selected, then the method further includes generating a first control signal to induce the second switch to have a first operational position to at least partially discharge the second battery cell group through a resistor to generate heat energy in the resistor, utilizing the computer, and generating a second control signal to turn on a fan to distribute the heat energy in the battery module to increase the temperature level of the battery module utilizing the computer.

DETAILED DESCRIPTION

Figure 1:
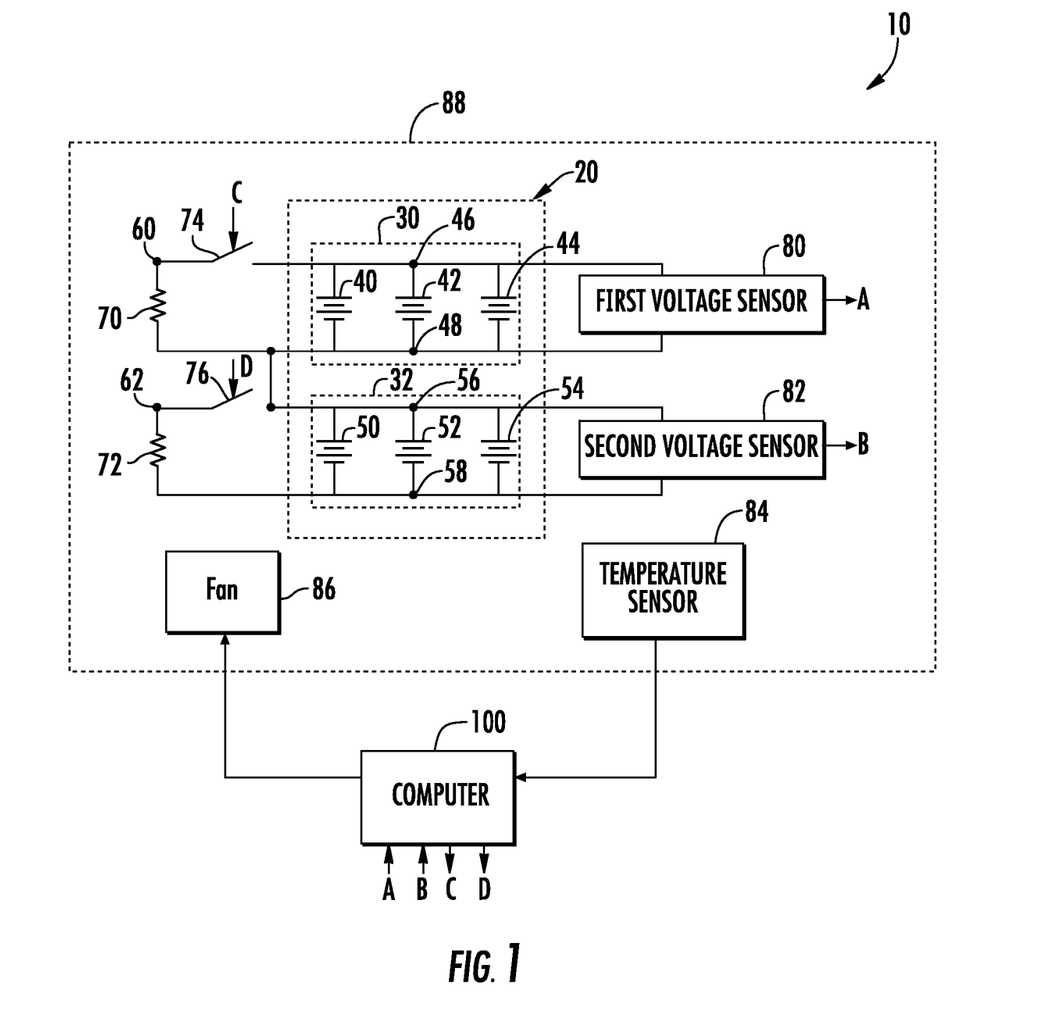
FIG. 1 is a schematic of a heating system for a battery module in accordance with an exemplary embodiment.

Referring to FIG. 1, a heating system 10 for heating a battery module 20, in accordance with an exemplary embodiment is provided. An advantage of the heating system 10 is that the system utilizes balancing resisters for generating heat energy to increase the temperature of the battery module 20 greater than or equal to a threshold temperature level while electrically balancing battery cells in the module 20. For purposes of understanding, the term "electrically balanced" means that two or more battery cells (or two or more battery cell groups) have substantially equal output voltages or substantially equal state-of-charges. The term "electrically balancing" means discharging one or more battery cells (or two or battery cell groups) to adjust associated output voltages toward one another or associated state-of-charges toward one another. The term "resistor" means one or more electrical components that dissipate electrical power through an internal impedance. For example, a resistor could comprise at least one of a carbon-based electrically resistive component, a wire-bound electrically resistive component, and a heating coil.

The battery module 20 includes a first battery cell group 30 and a second battery cell group 32. The first battery cell group 30 includes battery cells 40, 42, 44 that are electrically coupled in parallel to one another between nodes 46 and 48. In an alternative embodiment, the first battery cell group 30 could have less than three battery cells or greater than three battery cells electrically coupled in parallel therein. In one exemplary embodiment, the battery cells 40, 42, 44 are lithium-ion pouch type battery cells. Of course, in an alternative embodiment, the battery cells 40, 42, 44 could be other types of battery cells known to those skilled in the art. The second battery cell group 32 includes battery cells 50, 52, 54 that are electrically coupled in parallel to one another between nodes 56, 58. In an alternative embodiment, the second battery cell group 32 could have less than three battery cells or greater than three battery cells electrically coupled in parallel therein. In one exemplary embodiment, the battery cells 50, 52, 54 are lithium-ion pouch-type battery cells. Of course, in an alternative embodiment, the battery cells 50, 52, 54 could be other types of battery cells known to those skilled in the art.

The heating system 10 is provided to increase a temperature level of the battery module 20 when the temperature level falls below a threshold temperature level. The heating system 10 includes a first resistor 70, a second resistor 72, a first switch 74, a second switch 76, a first voltage sensor 80, a second voltage sensor 82, a temperature sensor 84, a fan 86, a housing 88, and a computer 100.

The first resistor 70 is electrically coupled between nodes 60, 48 and is electrically coupled in series with the first switch 74. The first switch 74 is further electrically coupled between the nodes 60, 46. The first resistor 70 is configured to be electrically coupled to the first battery cell group 30 when the first switch 74 has a first operational position (e.g., a closed operational position) in response to a control signal from the computer 100. When the first switch 74 has the first operational position, the first battery cell group 30 generates an electrical current that flows through the first resistor 72 to generate heat energy therein and to at least partially discharge the first battery cell group 30. The first resistor 70 is further configured to be electrically decoupled from the first battery cell group 30 when the first switch 74 has a second operational position (e.g., an open operational position) in response to the control signal no longer being supplied to the first switch 74 by the computer 100.

The second resistor 72 is electrically coupled between nodes 62, 58 and is electrically coupled in series with the second switch 76. The second switch 76 is further electrically coupled between the nodes 62, 56. The second resistor 72 is configured to be electrically coupled to the second battery cell group 32 when the second switch 76 has a first operational position (e.g., a closed operational position) in response to a control signal from the computer 100. When the second switch 76 has the first operational position, the second battery cell group 32 generates an electrical current that flows through the second resistor 72 to generate heat energy therein and to at least partially discharge the second battery cell group 32. The second resistor 72 is further configured to be electrically decoupled from the second battery cell group 32 when the second switch 76 has a second operational position (e.g., an open operational position) in response to the control signal no longer being supplied to the second switch 76 by the computer 100.

The first voltage sensor 80 is electrically coupled between the nodes 46, 48. The first voltage sensor 80 is configured to generate a first signal indicative of a first voltage level being output by the first battery cell group 30, that is received by the computer 100.

The second voltage sensor 82 is electrically coupled between the nodes 56, 58. The second voltage sensor 82 is configured to generate a second signal indicative of a second voltage level being output by the second battery cell group 32, that is received by the computer 100.

The temperature sensor 84 is disposed proximate to the first and second battery cell groups 30, 32. The temperature sensor 84 is configured to generate a temperature signal indicative of a temperature level of at least one of the first battery cell group 30 and the second battery cell group 32 that is received by the computer 80.

The fan 86 is disposed proximate to the first resistor 70 and to the second resistor 72. The fan 86 is configured to circulate air or another gas past the first and second resistors 70, 72 when the fan 86 is turned on to distribute heat energy from the resistors 70, 72 to the battery module 34 to increase a temperature level of the battery cells therein. The fan 86 is turned on by a control signal from the computer 100 and is turned off when the control signal is no longer supplied to the fan 86 by the computer 100.

The housing 88 is provided to enclose the first resistor 70, the second resistor 72, the first switch 74, the second switch 76, the first voltage sensor 80, the second voltage sensor 82, the temperature sensor 84, and the fan 86. In one exemplary embodiment, the computer 100 is disposed outside of the housing 88. Of course, in an alternative embodiment, the computer 100 may be disposed inside of the housing 80. In one exemplary embodiment, the housing 88 may be constructed of plastic. Of course, in an alternative embodiment, the housing 88 could be constructed of other materials known to those skilled in the art, such as stainless steel for example.

The computer 100 is electrically coupled to the first voltage sensor 80, the second voltage sensor 82, the temperature sensor 84, the fan 86, the first switch 74, and the second switch 76. The computer 100 has an internal memory for storing executable software instructions and associated data for implementing the method for heating the battery module 20 that will be explained in greater detail below. In one exemplary embodiment, the computer 100 comprises a microprocessor. Of course, in alternative embodiments, the computer 100 could comprise a programmable logic controller or a field programmable logic array.

Figure 2:
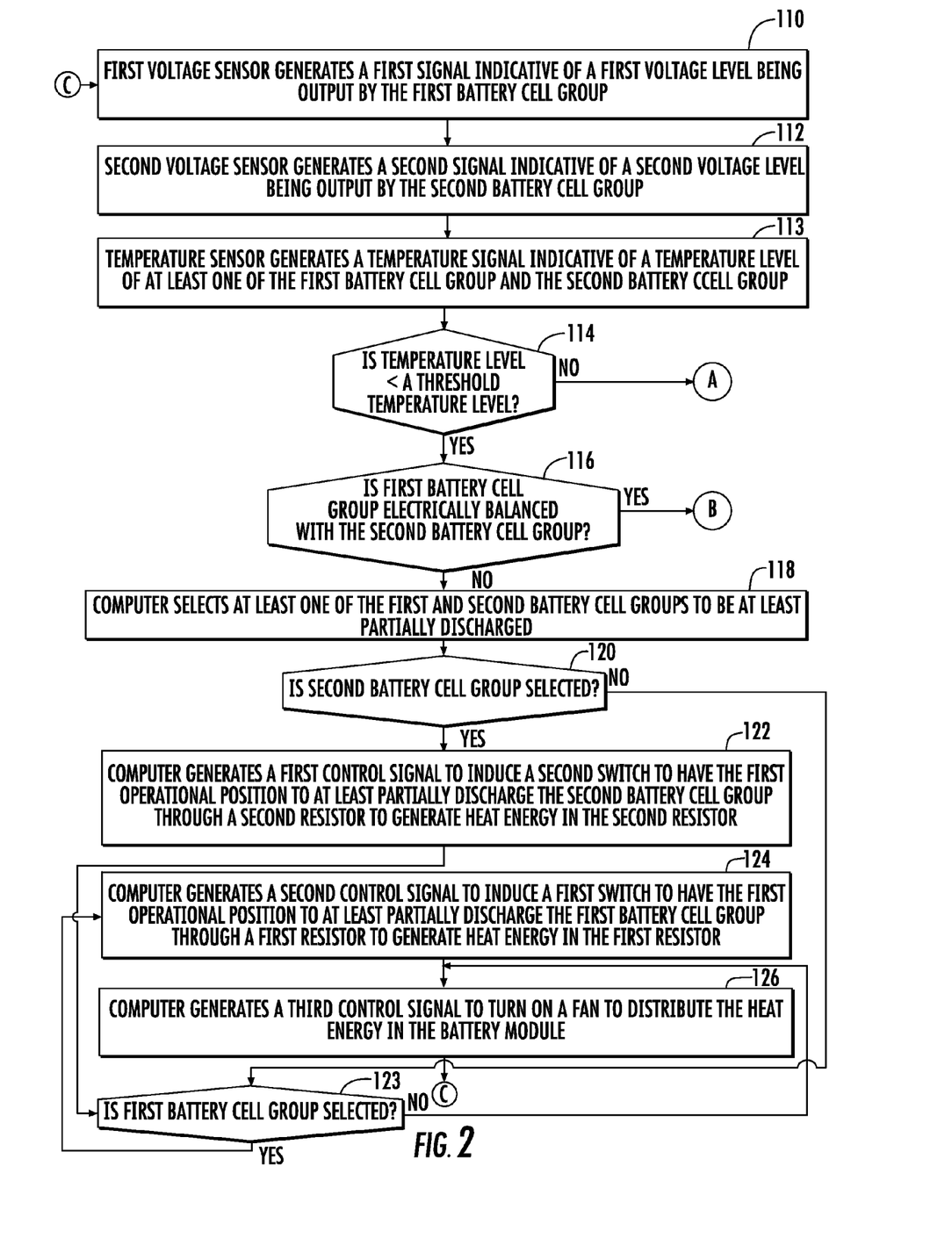
FIGS. 2-7 are flowcharts of a method for heating a battery module in accordance with another exemplary embodiment.
Figure 3:
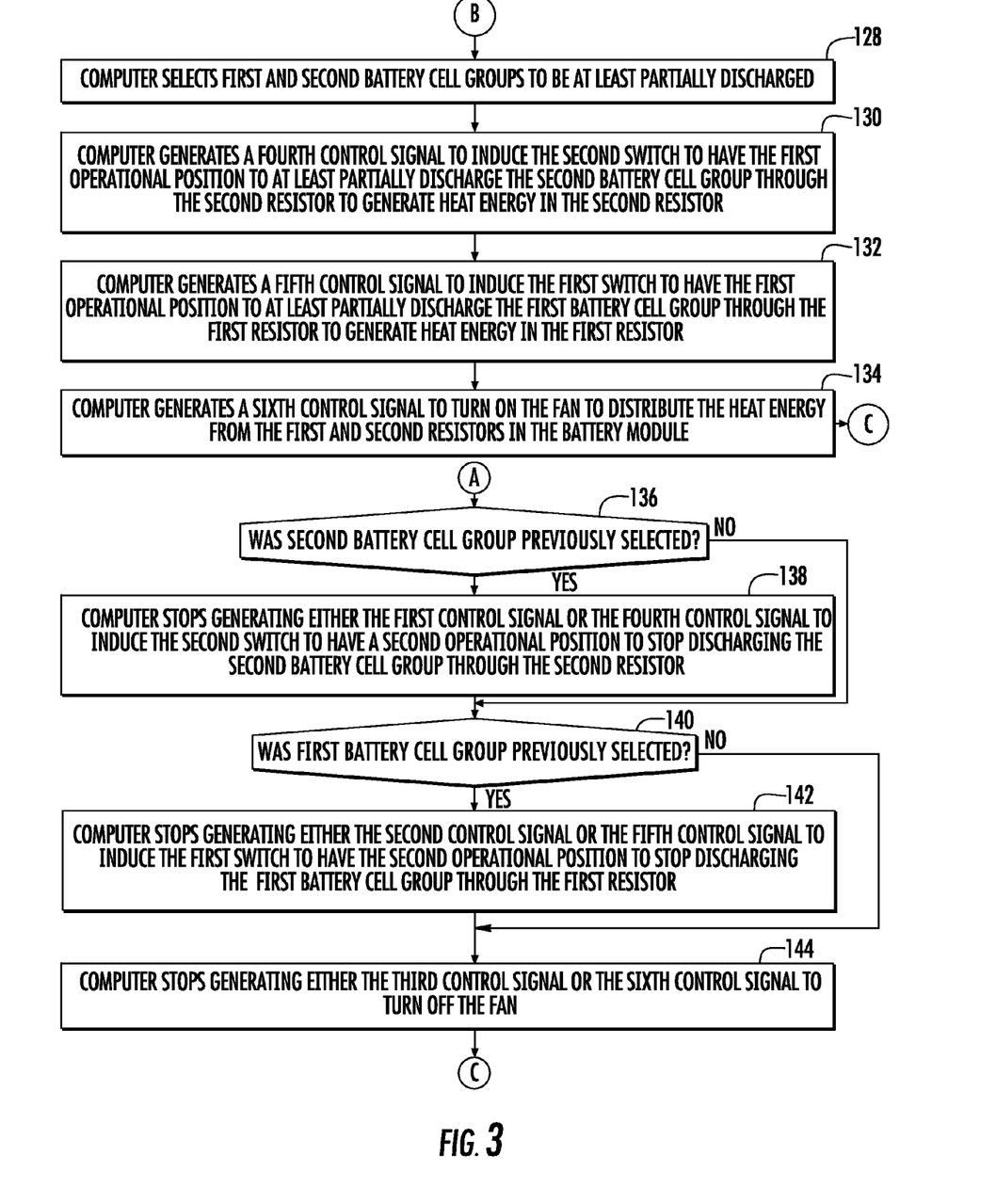

Referring to FIGS. 2 and 3, a flowchart of a method for heating the battery module 20 in accordance with another exemplary embodiment is provided.

At step 110, the first voltage sensor 80 generates a first signal indicative of a first voltage level being output by the first battery cell group 30. After step 110, the method advances to step 112.

At step 112, the second voltage sensor 82 generates a second signal indicative of a second voltage level being output by the second battery cell group 32. After step 112, the method advances to step 113.

At step 113, the temperature sensor 84 generates a temperature signal indicative of a temperature level of at least one of the first battery cell group 30 and the second battery cell group 32. After step 113, the method advances to step 114.

At step 114, the computer 100 makes a determination as to whether the temperature level is less than a threshold temperature level. In an exemplary embodiment, the threshold temperature level is within a temperature range of 0-10° C. In another exemplary embodiment, the threshold temperature level is 10° C. Of course, the threshold temperature level could be less than 0° C. or greater than 10° C. If the value of step 114 equals "yes", the method advances to step 116. Otherwise, the method advances to step 136.

At step 116, the computer 100 makes a determination as to whether the first battery cell group 30 is electrically balanced with the second battery cell group 32. If the value of step 116 equals "no", the method advances to step 118. Otherwise, the method advances to step 128.

At step 118, the computer 100 selects at least one of the first and second battery cell groups 30, 32 to be at least partially discharged based on the first and second signals such that one of the groups 30, 32 become more electrically balanced with the non-selected group while generating heat energy in a resistor to increase a temperature level of the battery cells. After step 118, method advances to step 120.

At step 120, the computer 100 determines whether the second battery cell group 32 was selected. If the second battery cell group 32 was selected, the method advances to step 122. Otherwise, method advances to step 123.

At step 122, the computer 100 generates a first control signal to induce a second switch 76 to have the first operational position to at least partially discharge the second battery cell group 32 through the second resistor 72 to generate heat energy in the second resistor 72. After step 122, the method advances to step 123.

At step 123, the computer 100 determines whether the first battery cell group 30 was selected. If the first battery cell group 30 was selected, the method advances to step 124. Otherwise, method advances to step 126.

At step 124, the computer 100 generates a second control signal to induce the first switch 74 to have the first operational position to at least partially discharge the first battery cell group 30 through the first resistor 70 to generate heat energy in the first resistor 70. After step 124, the method advances to step 126.

At step 126, the computer 100 generates a third control signal to turn on the fan 86 to distribute the heat energy in the battery module 20. After step 126, method returns to step 110.

Referring again to step 116, if the value of step 116 equals "yes", the method advances to step 128. At step 128, the computer 100 selects the first and second battery cell group 30, 32 to be at least partially discharged. After step 128, the method advances to step 130.

At step 130, the computer 100 generates a fourth control signal to induce the second switch 76 to have the first operational position to at least partially discharge the second battery cell group 32 through the second resistor 72 to generate heat energy in the second resistor 72. After step 130, the method advances to step 132.

At step 132, the computer 100 generates a fifth control signal to induce the first switch 74 to have the first operational position to at least partially discharge the first battery cell group 30 through the first resistor 70 to generate heat energy in the first resistor 70. After step 132, method advances to step 134.

At step 134, the computer 100 generates a sixth control signal to turn on the fan 86 to distribute the heat energy from the first and second resistors 70, 72 in the battery module 20. After step 134, the method returns to step 110.

Referring again to step 114, if the value of step 114 equals "no", method advances to step 136. At step 136, the computer 100 makes a determination as to whether the second battery cell group 32 was previously selected. If the value of step 136 equals "yes", the method advances to step 138. Otherwise, the method advances to step 140.

At step 138, the computer 100 stops generating either the first control signal or the fourth control signal to induce the second switch 76 to have a second operational position to stop discharging the second battery cell group 32 through the second resistor 72. After step 138, the method advances to step 140.

At step 140, the computer 100 makes a determination as to whether the first battery cell group 30 was previously selected. If the value of step 140 equals "yes", the method advances to step 142. Otherwise, the method advances to step 144.

At step 142, the computer 100 stops generating either the second control signal or the fifth control signal to induce the first switch 74 to have the second operational position to stop discharging the first battery cell group 30 through the first resistor 70. After step 142, the method advances to step 144.

At step 144, the computer 100 stops generating either the third control signal or the sixth control signal to turn off the fan 86. After step 144, the method returns to step 110.

Figure 4:
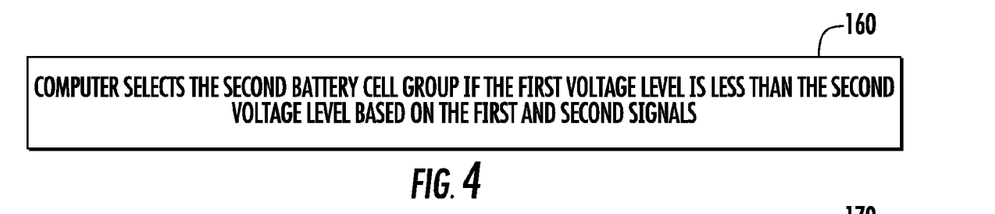

Referring to FIGS. 2 and 4, in one exemplary embodiment, the step 118 is implemented utilizing a step 160. At step 160, the computer 100 selects the second battery cell group if the first voltage level is less than the second voltage level based on the first and second signals.

Figure 5:
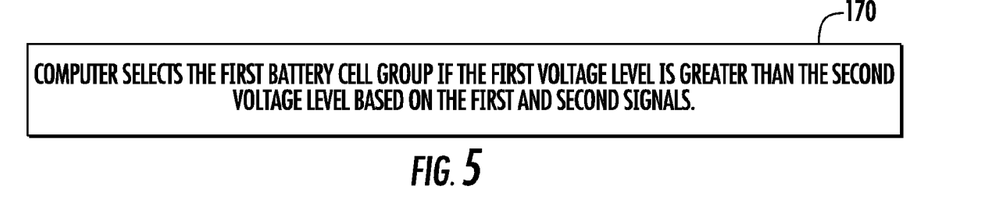

Referring to FIGS. 2 and 5, in one exemplary embodiment, the step 118 is implemented utilizing a step 170. At step 170, the computer 100 selects the first battery cell group if the first voltage level is greater than the second voltage level based on the first and second signals.

Figure 6:
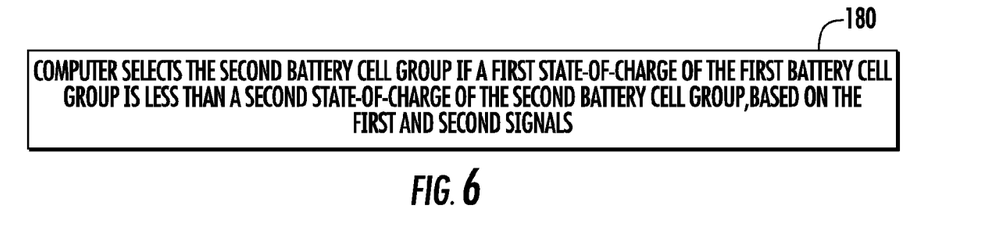

Referring to FIGS. 2 and 6, in another exemplary embodiment, the step 118 is implemented utilizing a step 180. At step 180, the computer 100 selects the second battery cell group if a first state-of-charge of the first battery cell group 30 is less than a second state-of-charge of the second battery cell group 32, based on the first and second signals. A state of charge of a battery cell group can be determined utilizing the following equation: state-of-charge=f(output voltage, temperature level of battery cell group). It should be noted that an output voltage of a battery cell group corresponds to an output voltage of a battery cell in the battery cell group. Also, a temperature level of a battery cell group corresponds to a temperature level of a battery cell in the battery cell group.

Figure 7:
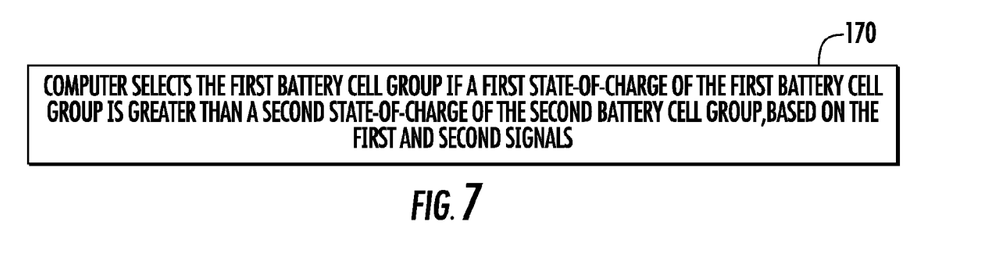

Referring to FIGS. 2 and 7, in another exemplary embodiment, the step 118 is implemented utilizing a step 190. At step 190, the computer 100 selects the first battery cell group 30 if a first state-of-charge of the first battery cell group 30 is greater than a second state-of-charge of the second battery cell group 32, based on the first and second signals.

The heating system 10 for the battery module 20 and the method for heating the battery module 20 provide a substantial advantage over other heating systems and methods. In particular, the heating system 10 and method utilize balancing resisters in the heating system for generating heat energy to increase the temperature of the battery module greater than or equal to a threshold temperature level while electrically balancing battery cells in the battery module 20.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A heating system for a battery module, the battery module having first and second battery cell groups, comprising:
    a first voltage sensor being coupled to first and second nodes of the first battery cell group, the first battery cell group having a first battery cell and a second battery cell, the first battery cell having a first positive terminal and a first negative terminal, the second battery cell having a second positive terminal and a second negative terminal, the first and second positive terminals being coupled to the first node, the first and second negative terminals being coupled to the second node, the first voltage sensor configured to generate a first signal indicative of a first voltage level being output by the first battery cell group between the first and second nodes;
    a second voltage sensor being coupled to third and fourth nodes of the second battery cell group, the third node being coupled to the second node, the second battery cell group having a third battery cell and a fourth battery cell, the third battery cell having a third positive terminal and a third negative terminal, the fourth battery cell having a fourth positive terminal and a fourth negative terminal, the third and fourth positive terminals being coupled to the third node, the third and fourth negative terminals being coupled to the fourth node, the second voltage sensor configured to generate a second signal indicative of a second voltage level being output by the second battery cell group between the third and fourth nodes;

a series combination of a first switch and a first resistor being electrically coupled in series between the first node and the second node, the first resistor being electrically coupled in parallel to the first battery cell group when the first switch has a first operational position;

a series combination of a second switch and a second resistor being electrically coupled in series between the third node and the fourth node, the second resistor being electrically coupled in parallel to the second battery cell group when the second switch has a first operational position;

a temperature sensor configured to generate a temperature signal indicative of a temperature level of at least one of the first battery cell group and the second battery cell group;

a computer being operably coupled to the first voltage sensor, the second voltage sensor, and the temperature sensor such that the computer receives the first signal, the second signal, and the temperature signal, respectively; the computer being further operably coupled to the first switch and the second switch;

the computer being programmed to determine if the first battery cell group is electrically balanced with the second battery cell group based on the first and second signals;

the computer being further programmed to select one of the first and second battery cell groups to be at least partially discharged, if the temperature level is less than a threshold temperature level, and the first battery cell group is not electrically balanced with the second battery cell group;

the computer being further programmed to generate a first control signal to induce the second switch to have the first operational position to at least partially discharge the second battery cell group through the second resistor to generate heat energy in the second resistor, if the second battery cell group is selected; and the computer being further programmed to generate a second control signal to turn on a fan to distribute the heat energy in the battery module to increase the temperature level of the battery module.

2. The heating system of claim 1, wherein the computer being further programmed to select one of the first and second battery cell groups comprises the computer being programmed to select the second battery cell group if the first voltage level is less than the second voltage level based on the first and second signals.

3. The heating system of claim 1, wherein the computer being further programmed to select one of the first and second battery cell groups comprises the computer being programmed to select the second battery cell group if a first state-of-charge of the first battery cell group is less than a second state-of-charge of the second battery cell group.

4. The heating system of claim 1, wherein the computer being further programmed to select one of the first and second battery cell groups comprises the computer being programmed to select the first battery cell group if the first voltage level is greater than the second voltage level based on the first and second signals.

5. The heating system of claim 1, wherein the computer being further programmed to select one of the first and second battery cell groups comprises the computer being programmed to select the first battery cell group if a first state-of-charge of the first battery cell group is greater than a second state-of-charge of the second battery cell group.

6. The heating system of claim 1, wherein the computer being further programmed to determine if the temperature signal indicates that the temperature level is greater than or equal to the threshold temperature level, the computer being further programmed to stop generating the first control signal to induce the second switch to have a second operational position to stop discharging the second battery cell group through the second resistor, if the temperature level is greater than or equal to the threshold temperature level; and the computer being further programmed to stop generating the second control signal to turn off the fan.

7. The heating system of claim 1, wherein the computer being further programmed to generate a third control signal to induce the first switch to have the first operational position to at least partially discharge the first battery cell group through the first resistor, if the temperature level is less than the threshold temperature level and the first battery cell group is selected.

8. The heating system of claim 1, wherein the computer being programmed to generate a third control signal to induce the second switch to have the first operational position to at least partially discharge the second battery cell group through the second resistor to generate heat energy in the second resistor, if both the first battery cell group is electrically balanced with the second battery cell group, and the temperature level is less than the threshold temperature level;

the computer being further programmed to generate a fourth control signal to induce the first switch to have the first operational position to at least partially discharge the first battery cell group through the first resistor to generate heat energy in the first resistor, if both the first battery cell group is electrically balanced with the second battery cell group, and the temperature level is less than the threshold temperature level; and the computer being further programmed to generate a fifth control signal to turn on the fan to distribute the heat energy from the first and second resistors in the battery module to increase the temperature level of the battery module.

9. The heating system of claim 1, further comprising:
a housing enclosing the first and second resistors, the temperature sensor, the first and second voltage sensors, and the first and second switches therein; and the computer being disposed outside of the housing.

10. A heating system for a battery module, the battery module having first and second battery cell groups, comprising:

a first voltage sensor being coupled to first and second nodes of the first battery cell group, the first battery cell group having a first battery cell and a second battery cell, the first battery cell having a first positive terminal and a first negative terminal, the second battery cell having a second positive terminal and a second negative terminal, the first and second positive terminals being coupled to the first node, the first and second negative terminals being coupled to the second node, the first voltage sensor configured to generate a first signal indicative of a first voltage level being output by the first battery cell group between the first and second nodes;

a second voltage sensor being coupled to third and fourth nodes of the second battery cell group, the third node being coupled to the second node, the second battery cell group having a third battery cell and a fourth battery cell, the third battery cell having a third positive terminal and a third negative terminal, the fourth battery cell having a fourth positive terminal and a fourth negative terminal, the third and fourth positive terminals being coupled to the third node, the third and fourth negative terminals being coupled to the fourth node, the second voltage sensor configured to generate a second signal indicative of a second voltage level being output by the second battery cell group between the third and fourth nodes;

a series combination of a first switch and a first resistor being electrically coupled in series the first node and the second node, the first resistor being electrically coupled in parallel to the first battery cell group when the first switch has a first operational position;

a series combination of a second switch and a second resistor being electrically coupled in series between the third node and the fourth node, the second resistor being electrically coupled in parallel to the second battery cell group when the second switch has a first operational position;

a temperature sensor configured to generate a temperature signal indicative of a temperature level of at least one of the first battery cell group and the second battery cell group;

a computer being operably coupled to the first voltage sensor, the second voltage sensor, and the temperature sensor such that the computer receives the first signal, the second signal, and the temperature signal, respectively; the computer being further operably coupled to the first switch and the second switch;

the computer being programmed to select the second battery cell group to be at least partially discharged, if both the second voltage level is greater than the first voltage level, and the temperature level is less than a threshold temperature level;

the computer being further programmed to generate a first control signal to induce the second switch to have the first operational position to at least partially discharge the second battery cell group through the second resistor to generate heat energy in the second resistor, if the second battery cell group is selected; and the computer being further programmed to generate a second control signal to turn on a fan to distribute the heat energy in the battery module to increase the temperature level of the battery module.

11. The heating system of claim 10, wherein:

the computer being further programmed to select the first battery cell group to be at least partially discharged, if both the first voltage level is greater than the second voltage level, and the temperature level is less than the threshold temperature level; and the computer being further programmed to generate a third control signal to induce the first switch to have the first operational position to at least partially discharge the first battery cell group through the first resistor to generate heat energy in the first resistor, if the first battery cell group is selected.

12. The heating system of claim 10, further comprising:

a housing enclosing the first and second resistors, the temperature sensor, the first and second voltage sensors, and the first and second switches therein; and the computer being disposed outside of the housing.

13. A heating system for a battery module, the battery module having first and second battery cell groups, comprising:

a first voltage sensor being coupled to first and second nodes of the first battery cell group, the first battery cell group having a first battery cell and a second battery cell, the first battery cell having a first positive terminal and a first negative terminal, the second battery cell having a second positive terminal and a second negative terminal, the first and second positive terminals being coupled to the first node, the first and second negative terminals being coupled to the second node, the first voltage sensor configured to generate a first signal indicative of a first voltage level being output by the first battery cell group between the first and second nodes;

a second voltage sensor being coupled to third and fourth nodes of the second battery cell group, the third node being coupled to the second node, the second battery cell group having a third battery cell and a fourth battery cell, the third battery cell having a third positive terminal and a third negative terminal, the fourth battery cell having a fourth positive terminal and a fourth negative terminal, the third and fourth positive terminals being coupled to the third node, the third and fourth negative terminals being coupled to the fourth node, the second voltage sensor configured to generate a second signal indicative of a second voltage level being output by the second battery cell group between the third and fourth nodes;

a series combination of a first switch and a first resistor being electrically coupled in series between the first node and the second node, the first resistor being electrically coupled in parallel to the first battery cell group when the first switch has a first operational position;

a series combination of a second switch and a second resistor being electrically coupled in series between the third node and the fourth node, the second resistor being electrically coupled in parallel to the second battery cell group when the second switch has a first operational position;

a temperature sensor configured to generate a temperature signal indicative of a temperature level of at least one of the first battery cell group and the second battery cell group;

a computer being operably coupled to the first voltage sensor, the second voltage sensor, and the temperature sensor such that the computer receives the first signal, the second signal, and the temperature signal, respectively; the computer being further operably coupled to the first switch and the second switch;

the computer being programmed to determine a first state-of-charge of first battery cell group based on the first voltage level, the second state-of-charge of the second battery cell group based on the second voltage level;

the computer being further programmed to select the second battery cell group to be at least partially discharged, if both the second state-of-charge is greater than the first state-of-charge, and the temperature level is less than a threshold temperature level;

the computer being further programmed to generate a first control signal to induce the second switch to have the first operational position to at least partially discharge the second battery cell group through the second resistor to generate heat energy in the second resistor, if the second battery cell group is selected; and the computer being further programmed to generate a second control signal to turn on a fan to distribute the heat energy in the battery module to increase the temperature level of the battery module.

14. The heating system of claim 13, wherein:

the computer being further programmed to select the first battery cell group to be at least partially discharged, if both the first state-of-charge is greater than the second state-of-charge, and the temperature level is less than the threshold temperature level; and the computer being further programmed to generate a third control signal to induce the first switch to have the first operational position to at least partially discharge the first battery cell group through the first resistor to generate heat energy in the first resistor, if the first battery cell group is selected.

* * * * *